United States Patent
Johnson

(10) Patent No.: US 10,252,587 B1
(45) Date of Patent: Apr. 9, 2019

(54) QUICK REPLACEMENT AIR VALUE

(71) Applicant: Neil Johnson, Springdale, AR (US)

(72) Inventor: Neil Johnson, Springdale, AR (US)

(*) Notice: Subject to any disclaimer, the term of this patent is extended or adjusted under 35 U.S.C. 154(b) by 81 days.

(21) Appl. No.: 15/640,740

(22) Filed: Jul. 3, 2017

Related U.S. Application Data

(60) Provisional application No. 62/357,844, filed on Jul. 1, 2016.

(51) Int. Cl.
*B60C 27/18* (2006.01)
*B60C 25/18* (2006.01)
*B60C 29/00* (2006.01)
*B60C 29/02* (2006.01)

(52) U.S. Cl.
CPC .......... *B60C 25/18* (2013.01); *B60C 29/002* (2013.01); *B60C 29/005* (2013.01); *B60C 29/02* (2013.01)

(58) Field of Classification Search
CPC ......... B60C 27/18; B60C 29/00; B60C 25/18; B60C 29/002; B60C 29/005; B60C 29/02
USPC .............................................. 29/213.1, 221.5
See application file for complete search history.

(56) References Cited

U.S. PATENT DOCUMENTS

| | | | | |
|---|---|---|---|---|
| 543,297 A * | 7/1895 | Davis | .............. | B60C 29/02 152/427 |
| 2,709,383 A * | 5/1955 | Davies | .............. | B25B 27/24 29/221.5 |
| 2,940,167 A * | 6/1960 | Boyer | .............. | B60C 25/18 254/120 |
| 2,968,333 A * | 1/1961 | Ayres | .............. | B60C 25/18 152/427 |
| 3,387,354 A * | 6/1968 | Mossberg | .............. | B60C 25/18 29/221.5 |
| 3,511,295 A * | 5/1970 | Kilmarx | .............. | B60C 29/02 152/427 |
| 3,750,258 A * | 8/1973 | Sampo | .............. | B60C 25/18 29/221.5 |
| 4,765,048 A * | 8/1988 | Hokanson | .............. | B25B 27/023 29/221.5 |
| 5,097,580 A * | 3/1992 | Story | .............. | B25B 27/026 29/221.5 |
| 5,803,108 A * | 9/1998 | Schuessler, Jr. | .............. | B60C 29/062 137/15.08 |
| 6,574,843 B1 * | 6/2003 | Meadows | .............. | B25B 27/24 29/221.5 |
| 8,245,747 B2 * | 8/2012 | Monjuvent | .............. | B60C 23/0408 152/427 |
| 9,272,588 B1 * | 3/2016 | Groom | .............. | B60C 29/02 |
| 2003/0066176 A1 * | 4/2003 | Rivers | .............. | B25B 27/24 29/221.5 |
| 2003/0213111 A1 * | 11/2003 | Groves | .............. | B25B 13/48 29/221.5 |
| 2004/0016096 A1 * | 1/2004 | Capoferi | .............. | B25B 27/0028 29/213.1 |
| 2013/0186536 A1 * | 7/2013 | Lee | .............. | B60C 29/02 152/427 |

* cited by examiner

*Primary Examiner* — George B Nguyen
(74) *Attorney, Agent, or Firm* — Keisling & Pieper PLC; David B. Pieper

(57) ABSTRACT

An exterior installable air valve for a tire rim using an exterior operated nut compressing a gasket against a wedge to expand the gasket for sealing to a wheel rim.

8 Claims, 2 Drawing Sheets

QUICK REPLACEMENT AIR VALUE

CROSS-REFERENCE TO RELATED APPLICATIONS

This application claims priority to and is a continuation in part of U.S. Provisional Application 62/357,844 filed by Neil Johnson on Jul. 1, 2016 entitled Quick Replacement Air Valve.

STATEMENT REGARDING FEDERALLY SPONSORED RESEARCH OR DEVELOPMENT

Not Applicable.

REFERENCE TO A MICROFICHE APPENDIX

Not Applicable.

RESERVATION OF RIGHTS

A portion of the disclosure of this patent document contains material which is subject to intellectual property rights such as but not limited to copyright, trademark, and/or trade dress protection. The owner has no objection to the facsimile reproduction by anyone of the patent document or the patent disclosure as it appears in the Patent and Trademark Office patent files or records but otherwise reserves all rights whatsoever.

BACKGROUND OF THE INVENTION

1. Field of the Invention

The present invention relates to improvements in air valves. More particularly, the invention relates to improvements particularly suited for providing quick replacement of tire air valves without requiring removal of the tire from the rim. In particular, the present invention relates specifically to a wedge biased rim seal air valve.

2. Description of the Known Art

As will be appreciated by those skilled in the art, wheel valves for inflating tires mounted to wheel rims are known in various forms. Patents disclosing information relevant to wheel valves include: U.S. Pat. No. 9,272,588, issued to Groom, et al. on Mar. 1, 2016 entitled Method and apparatus for replacing a tire valve stem without having to raise the vehicle, remove the wheel, or tire from the wheel; U.S. Pat. No. 3,750,258, issued to Sampo Aug. 7, 1973 INSERTION TOOL FOR TIRE VALVE STEMS U.S. Pat. No. 5,097,580, issued to Story on Mar. 24, 1992 entitled Apparatus for installing and removing valve stems U.S. Pat. No. 6,574,843, issued to Meadows on Jun. 10, 2003 entitled Method and apparatus for installing and replacing valve stems. Each of these patents is hereby expressly incorporated by reference in their entirety.

From these prior references, it may be seen that these prior art patents are very limited in their teaching and utilization, and an improved valve stem is needed to overcome these limitations.

SUMMARY OF THE INVENTION

The present invention is directed to an improved externally replaceable wheel valve using a wedge expandable gasket. In the preferred embodiment, a tool free stem installation is provided by using an external wingnut to provide the wedge expansion forces. In accordance with one exemplary embodiment of the present invention, a wedge valve stem is provided using an expandable gasket to seal against the wheel stem aperture and the external face of the wheel rim. These and other objects and advantages of the present invention, along with features of novelty appurtenant thereto, will appear or become apparent by reviewing the following detailed description of the invention.

BRIEF DESCRIPTION OF THE SEVERAL VIEWS OF THE DRAWINGS

In the following drawings, which form a part of the specification and which are to be construed in conjunction therewith, and in which like reference numerals have been employed throughout wherever possible to indicate like parts in the various views.

DETAILED DESCRIPTION OF THE INVENTION

Figure 1:
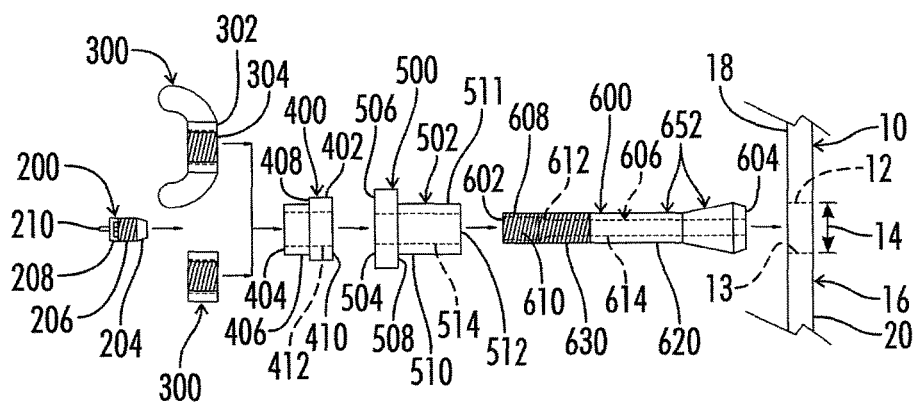
FIG. 1 is a schematic exploded parts view of a wedge valve stem.

As shown in FIGS. 1 through 5 of the drawings, one exemplary embodiment of the present invention is generally shown as a wedge air valve 100.

The air valve assembly 100 is mounted to a tire rim 10 using a valve aperture 12 having an aperture diameter 14. The tire rim 10 also has a rim thickness 16 measured from the external rim face 18 to the internal rim face 20.

The wedge air valve assembly 100 is constructed from a core 200, exterior accessible nut 300, T shaped pressure slider 400, elastic seal 500, and a wedge valve stem 600.

The core 200 includes a core body 202 defining a valve seat 204, a core thread 206, and a tool flat 208, with the operation controlled by a pressure stem 210. This is a typical Schrader valve construction for a short type valve core. The core 200 mounts into the wedge valve stem 600 with the core thread 206 engaging the aperture thread 610 and the valve seat 204 sealably engaging the reducing core seat 612.

The exterior accessible nut 300 is of typical construction with a nut body 302, internal aperture nut thread 304, and facets or wing ears 306. The nut thread 304 engages the neck thread 630 the engage the wedge 650 against the t seal 500.

The pressure slider 400 can be a typical flat washer with a hole in it, but for the preferred embodiment uses a T shaped slider body 402 with a nut end 404, offset arm 406, expanding shoulder 408, and seal end 410. The T shaped slider body defines a slider aperture 412 that fits around the neck 620 of the wedge valve stem 600.

The t seal 500 is an elastomer such as a rubber or polymer typically used for tire valves. This t seal 500 is made with a seal body 502 formed with a slider end 504 having a thickness with a face seal 506 transitioning through a reducing shoulder 508, to an inward arm 510 with an arm seal 511, to a wedge end 512. The reducing shoulder 508 seals against the external rim face 18, and the arm seal 511 engages against the aperture face 13 of the valve aperture 12. The T seal defines a wedge aperture 514 for mounting onto the wedge valve stem 600. Different diameters are used for different sized tire valve replacements. We have also discovered that a harder, but still compressible, urethane material also works for this application. The urethane resists sharp edges on the tire rim effectively.

The wedge valve stem 600 is a machined metal part beginning at an outer end 602 and continuing to the inner end 604 with a stem aperture 606 flowably connecting the ends 602, 604. The length of the stem changes for varying tire sizes of dually type applications with longer stems. The stem aperture 606 begins at the outer end 602 with a core well 608 having an aperture thread 610 and a reducing core seat 612 flowably connected to an inner tunnel 614 extending to the inner end 604. The core 200 is threaded into the core well 608 until sealably engaging the reducing core seat 612.

The outer end 602 is extended away from the external rim face 18 of the tire rim 10 via a neck 620 having a neck length 622 including a neck thread 630 with a thread length 632. The neck thread 630 terminates at the stop offset 640 to define an offset length 642. The offset length controls the maximum pressure that can be applied to the t seal 500 by the wedge 650.

The neck 620 transitions to the wedge 650. The wedge 650 includes a wedge angle 652 expanding from an inner wedge width 656 to an outer wedge width 654 along a wedge length 658. The wedge 650 ends at an inwardly angled insertion nose 660 transitioning to a nose reduction 662 that simply makes it easier to insert the valve assembly 100.

Figure 2:
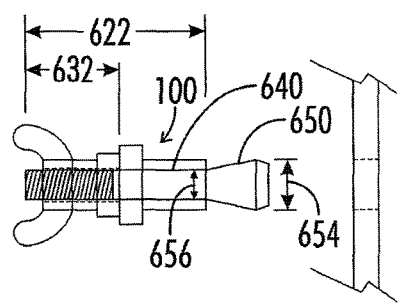
FIG. 2 is a schematic assembled parts view thereof before rim installation.
Figure 3:
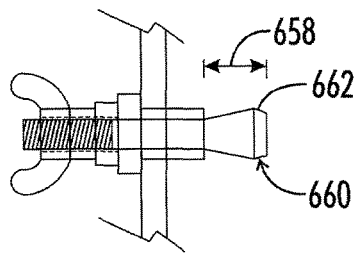
FIG. 3 is a schematic assembled parts view thereof inserted before expansion.
Figure 4:
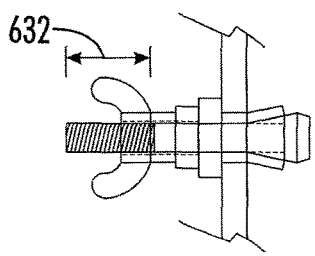
FIG. 4 is a schematic assembled parts view thereof inserted and expanded.
Figure 5:
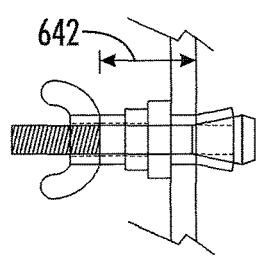
FIG. 5 is a schematic assembled parts view thereof at the thread controlled expansion limit.
Figure 6:
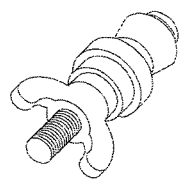
FIG. 6 is an assembled perspective view with a wing nut.
Figure 7:
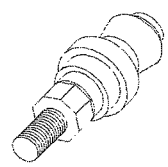
FIG. 7 is an assembled perspective view with a faceted nut.
Figure 8:
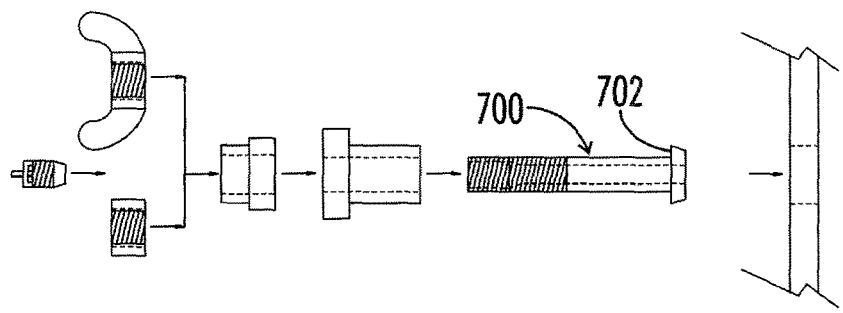
FIG. 8 is a schematic exploded parts view of a smaller than hole size flange valve stem.
Figure 9:
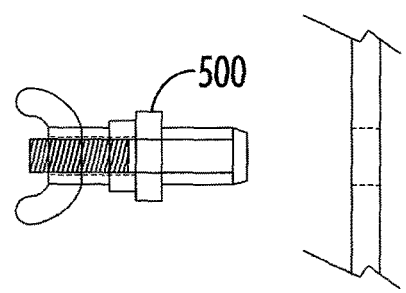
FIG. 9 is a schematic assembled parts view thereof before rim installation.
Figure 10:
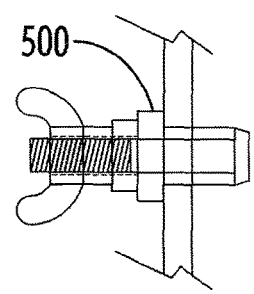
FIG. 10 is a schematic assembled parts view thereof inserted before expansion.
Figure 11:
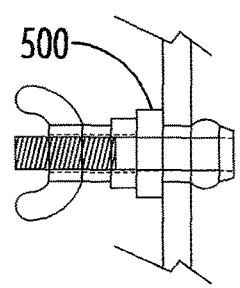
FIG. 11 is a schematic assembled parts view thereof inserted and expanded.

FIG. 1 shows the exploded parts view of the wedge air valve assembly 100. FIG. 2 shows how the core 200 is mounted into the wedge valve stem 600 and how the exterior accessible nut 300, T shaped pressure slider 400, and elastic seal 500 are mounted onto the neck 620 of the valve stem 600. The nut thread 304 of the exterior accessible nut 300 engages the neck thread 630, but note that the wedge 650 has not yet engaged the elastic seal 502. FIG. 3 shows the assembly 100 installed through the rim aperture 12. The reducing shoulder 508 frictionally engages the external rim face 18 and the wedge aperture 514 frictionally engages the valve stem 600 to hold the stem 600 in place when the nut 300 is tightened. FIG. 4 shows the wedge 650 engaging the seal 500 and both pressuring the face seal 506 against the external rim face 18 and the arm seal 511 against the aperture face 13 such that two seals are formed to enhance operation of the assembly 100. FIG. 5 shows how the exterior accessible nut 300 can be further tightened for additional pressure. FIG. 5 also shows how the travel of the exterior accessible nut 300 can be limited to limit the force applied to the seal 500 by the position of the termination of the neck thread 630 at the stop offset 640 if desired.

FIG. 8 through 11 show the smaller than hole size flange valve stem 700. The smaller than hole size flange valve stem 700 has a smaller than hole flange 702 that can pass through the valve aperture 12 and then compress the seal 500 to expand the diameter of the seal 500 against the valve aperture 12. This again uses an insertion nose 660 to ease installation.

Reference numerals used throughout the detailed description and the drawings correspond to the following elements:

| | |
|---|---|
| Tire rim | 10 |
| Valve aperture | 12 |
| Aperture face | 13 |
| Aperture diameter | 14 |
| Rim thickness | 16 |
| External rim face | 18 |
| Internal rim face | 20 |
| Air valve assembly | 100 |
| Core | 200 |
| Core body | 202 |
| Valve seat | 204 |
| Core thread | 206 |
| Tool flat | 208 |
| Pressure stem | 210 |
| Exterior accessible nut | 300 |
| Nut body | 302 |
| Nut thread | 304 |
| Facets or wing ears | 306 |
| Pressure slider | 400 |
| Slider body | 402 |
| Nut end | 404 |
| Offset arm | 406 |
| Expanding shoulder | 408 |
| Seal end | 410 |
| Slider aperture | 412 |
| Seal | 500 |
| Seal body | 502 |
| Slider end | 504 |
| Face seal | 506 |
| Reducing shoulder | 508 |
| Inward arm | 510 |
| Arm seal | 511 |
| Wedge end | 512 |
| Wedge aperture | 514 |
| Wedge valve stem | 600 |
| Outer end | 602 |
| Inner end | 604 |
| Stem aperture | 606 |
| Core well | 608 |
| Aperture thread | 610 |
| Reducing core seat | 612 |
| inner tunnel | 614 |
| Neck | 620 |
| Neck length | 622 |
| Neck thread | 630 |
| Thread length | 632 |
| Stop Offset | 640 |
| Offset length | 642 |
| Wedge | 650 |
| Wedge angle | 652 |
| Outer wedge width | 654 |
| Inner wedge width | 656 |
| Wedge length | 658 |
| Insertion Nose | 660 |
| Nose reduction | 662 |

From the foregoing, it will be seen that this invention well adapted to obtain all the ends and objects herein set forth, together with other advantages which are inherent to the structure. It will also be understood that certain features and subcombinations are of utility and may be employed without reference to other features and subcombinations. This is contemplated by and is within the scope of the claims. Many possible embodiments may be made of the invention without departing from the scope thereof. Therefore, it is to be understood that all matter herein set forth or shown in the accompanying drawings is to be interpreted as illustrative and not in a limiting sense.

When interpreting the claims of this application, method claims may be recognized by the explicit use of the word 'method' in the preamble of the claims and the use of the 'ing' tense of the active word. Method claims should not be interpreted to have particular steps in a particular order unless the claim element specifically refers to a previous element, a previous action, or the result of a previous action. Apparatus claims may be recognized by the use of the word 'apparatus' in the preamble of the claim and should not be interpreted to have 'means plus function language' unless the word 'means' is specifically used in the claim element. The words 'defining,' 'having,' or 'including' should be interpreted as open ended claim language that allows additional elements or structures. Finally, where the claims recite "a" or "a first" element of the equivalent thereof, such claims should be understood to include incorporation of one or more such elements, neither requiring nor excluding two or more such elements.

What is claimed is:

1. An air valve apparatus for a tire rim including an external face defining a valve aperture with an aperture diameter, the assembly comprising:
   a wedge valve stem with an inside and an outside including stem threads and a wedge;
   a valve core mounted inside the wedge valve stem;
   a seal mounted on the outside of the wedge valve stem;
   an exterior accessible nut engageable with the stem threads, wherein movement of the exterior accessible nut on the stem treads moves the seal on the wedge to expand the seal.

2. The apparatus of claim 1, further comprising:
   the exterior accessible nut including a nut body with facets.

3. The apparatus of claim 1, further comprising:
   the exterior accessible nut including a nut body with wing ears.

4. The apparatus of claim 1, further comprising:
   a pressure slider positioned between the seal and the exterior accessible nut.

5. The apparatus of claim 4 the pressure slider, further comprising:
   a slider body including an expanding shoulder positioned against the seal.

6. The apparatus of claim 4 the seal, further comprising:
   a seal body including a reducing shoulder.

7. The apparatus of claim 1,
   the stem threads ending at a stop offset for limiting the pressure applied to the seal.

8. The apparatus of claim 1,
   the wedge valve stem including an insertion nose with a nose reduction.

\* \* \* \* \*